United States Patent Office 2,885,412
Patented May 5, 1959

2,885,412

9α - FLUORO - Δ¹ - 3,20 - DIKETO - 11,21 - BIS - OXYGENATED - 17 - HYDROXY - ALLOPREGNENES AND PROCESSES FOR PREPARING THEM

Ralph F. Hirschmann, Westfield, and Richard Miller, New Brunswick, N.J., assignors to Merck & Co., Inc., Rahway, N.J., a corporation of New Jersey No Drawing. Application May 26, 1955
Serial No. 511,401

8 Claims. (Cl. 260—397.45)

This invention is concerned generally with novel steroid compounds and with processes for preparing them. More particularly, it relates to 9α-fluoro-Δ¹-3,20-diketo-11,21 - bis - oxygenated - 17 - hydroxy-allopregnene compounds, and to processes of preparing these compounds starting with 9α-fluoro-3,20-diketo-11-oxygenated-17-hydroxy-21-acyloxy-allopregnanes. These novel 9α-fluoro-Δ¹ - 3,20-diketo-11,21-bis-oxygenated - 17 - hydroxy-allopregnene compounds possess cortisone activity, but differ from cortisone and hydrocortisone in not possessing any appreciable sodium or water retention action. The new compounds are especially effective in the treatment of arthritis and related diseases since they can be administered for their cortisone action without producing the undesired metabolic effects such as edema, which are caused by the sodium and water retention of cortisone.

These novel 9α-fluoro-Δ¹ - 3,20 - diketo-11,21-bis-oxygenated-17-hydroxy-allopregnene compounds, subject of the present invention, may be chemically represented as follows:

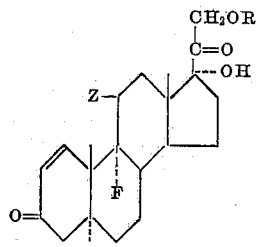

wherein Z is a keto or hydroxy radical, and R is hydrogen or an acyl radical.

The 9α-fluoro-Δ¹-3,20-diketo-11,21-bis-oxygenated-17-hydroxy-allopregnene compounds may be prepared by reacting a 9α-fluoro-3,20-diketo-11-oxygenated-17-hydroxy-21-acyloxy-allopregnane compound (Compound 1 hereinbelow) with one molecular equivalent of bromine to form the corresponding 2-bromo-9α-fluoro-3,20-diketo-11-oxygenated-17-hydroxy-21-acyloxy - allopregnane compound (Compound 2), which is reacted with semicarbazide thereby simultaneously forming the 3-semicarbazone and removing the elements of hydrogen bromide from the molecule to produce the 3-semicarbazone of the corresponding 9α - fluoro-Δ¹-3,20-diketo-11-oxygenated-17-hydroxy-21-acyloxy-allopregnene compound (Compound 3). This 3-semicarbazone is then reacted with an acidic hydrolyzing agent in the presence of a carbonyl acceptor such as pyruvic acid to form the 9α-fluoro-Δ¹-3,20-diketo-11-oxygenated-17-hydroxy-21-acyloxy - allopregnene (Compound 4 where R' is acyl), which may be hydrolyzed, if desired, by reaction with an alcoholic solution of potassium hydroxide to produce the 9α-fluoro-Δ¹-3,20-diketo-11-oxygenated - 17,21 - dihydroxy - allopregnene (Compound 4 where R' is hydrogen). The reactions indicated hereinabove may be chemically represented as follows:

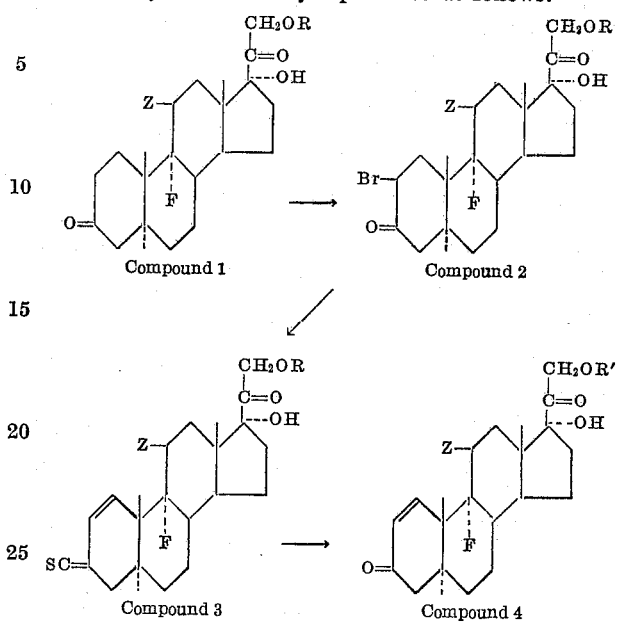

Compound 1 Compound 2

Compound 3 Compound 4 wherein Z is a keto or hydroxy radical, R is an acyl radical, SC stands for a semicarbazone substituent, and R' is hydrogen or an acyl radical.

The starting materials used in the foregoing process, the 9α - fluoro-3,20-diketo-11-oxygenated-17-hydroxy-21-acyloxy-allopregnanes are conveniently prepared by reacting the corresponding 9α-fluoro-Δ⁴-3,20-diketo-11-oxygenated-17-hydroxy-21-acyloxy-pregnene (i.e. 9α-fluorocortisone 21-acylate and 9α-fluoro-hydrocortisone 21-acylate) with hydrogen in the presence of palladium catalyst whereby the Δ⁴-unsaturated linkage is selectively reduced without substantially affecting other reducible linkages in the molecule to produce the 9α-fluoro-3,20-diketo-11-oxygenated - 17 - hydroxy-21-acyloxy-allopregnane, as for example 9α-fluoro-3,11,20-triketo-17-hydroxy-21-acyloxy-allopregnanes such as 9α-fluoro-3,11,20-triketo-17α,21-dihydroxy-allopregnane 21-alkanoate, 9α-fluoro-3,11,20-triketo-17α,21-dihydroxy-allopregnane 21-acetate, 9α - fluoro-3,11,20-triketo-17α,21-dihydroxy-allopregnane 21-t-butylacetate, 9α-fluoro-3,11,20-triketo-17α, 21-dihydroxy-allopregnane 21 - benzoate, 9α-fluoro-3,20-diketo-11,17-dihydroxy-21-acyloxy-allopregnanes such as 9α-fluoro - 3,20 - diketo - 11β,17α,21-trihydroxy-allopregnane 21-alkanoate, 9α-fluoro-3,20-diketo-11β,17α,21-trihydroxy-allopregnane 21-acetate, 9α-fluoro-3,20-diketo-11β,17α,21-trihydroxy-allopregnane 21-t-butylacetate, 9α-fluoro-3,20-diketo-11β,17α,21-trihydroxy-allopregnane 21-benzoate, and the like.

The reaction between the 9α-fluoro-3,20-diketo-11-oxygenated-17-hydroxy-21-acyloxy-allopregnane and the one molecular equivalent of bromine is conveniently conducted by bringing the reactants together in an inert organic solvent as for example a halogenated hydrocarbon solvent, such as chloroform, carbon tetrachloride, a lower alkanoic acid such as acetic acid, and the like, under substantially anhydrous conditions in the presence of an acidic catalyst such as hydrogen bromide, p-toluene sulfonic acid, and the like. It is ordinarily preferred to treat the 9α - fluoro - 3,20-diketo-11-oxygenated-17-hydroxy-21-acyloxy-allopregnane, in chloroform containing a catalytic amount (i.e. a few drops) of a glacial acetic acid solution of p-toluene sulfonic acid, with a solution of one molar equivalent of bromine in glacial acetic acid. The reaction is ordinarily complete in about 10-15 minutes. The product is conveniently recovered by evaporating the halogenated hydrocarbon solvent, such as chloroform, in vacuo, diluting the resulting mixture with water, and recovering the precipitated brominated product by filtration. This material is dissolved in dichloromethane, the resulting solution is washed with aqueous sodium bicarbonate solution and then with water, and dried. The dried dichloromethane solution is evaporated to dryness, and the residual material is recrystallized from acetonitrile to give the 2-bromo-9α-fluoro-3,20-diketo-11-oxygenated-17-hydroxy-21-acyloxy-allopregnane, as for example 2-bromo - 9α - fluoro - 3,11,20 - triketo - 17 - hydroxy - 21-acyloxy-allopregnanes such as 2-bromo-9α-fluoro-3,11,20-triketo-17α,21-dihydroxy-allopregnane 21-acetate, 2-bromo - 9α - fluoro - 3,11,20 - triketo - 17α,21 - dihydroxyallopregnane 21-t-butylacetate or other 2-bromo-9α-fluoro-3,11,20 - triketo - 17α,21 - dihydroxy - allopregnane 21 - alkanoate, 2 - bromo - 9α - fluoro - 3,20 - diketo-11β,17α - dihydroxy - 21 - acyloxy - allopregnanes such as 2 - bromo - 9α - fluoro - 3,20 - diketo - 11β,17α,21-trihydroxy - allopregnane 21 - alkanoate, 2 - bromo - 9α-fluoro - 3,20 - diketo - 11β,17α,21 - trihydroxy - allopregnane 21 - acetate, 2 - bromo - 9α - fluoro - 3,20 - diketo-11β,17α,21-trihydroxy-allopregnane 21-t-butylacetate, 2-bromo - 9α - fluoro - 3,20 - diketo - 11β,17α,21 - trihydroxy-allopregnane 21-benzoate, and the like.

The reaction between the 2-bromo-9α-fluoro-3,20-diketo - 11 - oxygenated - 17 - hydroxy - 21 - acyloxy - allopregnane compound and semicarbazide is ordinarily conducted by bringing the reactants together in the presence of an organic solvent, preferably acetonitrile, a chlorinated hydrocarbon, such as chloroform, and the like. The semicarbazide is conveniently prepared in the reaction mixture by treating a salt of semicarbazide, such as semicarbazide hydrochloride, with a basic substance such as sodium acetate. It is preferred to treat the 2-bromo - 9α - fluoro - 3,20 - diketo - 11 - oxygenated - 17-hydroxy-21-acyloxy-allopregnane compound in acetonitrile solution with an aqueous solution of semicarbazide hydrochloride and sodium acetate under an inert atmosphere such as nitrogen, at approximately room temperature, under which conditions the reaction is usually complete in about 4-5 hours. The material which precipitates from the reaction solution is recovered by filtration, and washed with water to give the 3-semicarbazone of the 9α - fluoro - Δ¹ - 3,20 - diketo - 11 - oxygenated - 17-hydroxy - 21 - acyloxy - allopregnene compound as for example a 9α - fluoro - Δ¹ - 3,11,20 - triketo - 17α - hydroxy - 21 - acyloxy - allopregnene 3-semicarbazone such as 9α - fluoro - Δ¹ - 3,11,20 - triketo - 17α,21 - dihydroxyallopregnene 3 - semicarbazone - 21 - alkanoate, 9α-fluoro - Δ¹ - 3,11,20 - triketo - 17α,21 - dihydroxy - allopregnene 3 - semicarbazone - 21 - acetate, 9α - fluoro - Δ¹ - 3,11,20 - triketo - 17α,21 - dihydroxy - allopregnene 3-semicarbazone 21 - t - butylacetate, 9α - fluoro - Δ¹-3,11,20 - triketo - 17α,21 - dihydroxy - allopregnene 3-semicarbazone 21 - benzoate, a 9α - fluoro - Δ¹ - 3,20-diketo - 11β,17α - dihydroxy - 21 - acyloxy - allopregnene 3-semicarbazone, such as 9α-fluoro-Δ¹-3,20-diketo-11β,17α,21-trihydroxy-allopregnene 3-semicarbazone 21-alkanoate, 9α - fluoro - Δ¹ - 3,20 - diketo - 11β,17α,21-trihydroxy - allopregnene 3-semicarbazone 21 - acetate, 9α - fluoro - Δ¹ - 3,20 - diketo - 11β,17α,21 - trihydroxyallopregnene 3 - semicarbazone 21 - t - butylacetate, 9α-fluoro - Δ¹ - 3,20 - diketo - 11β,17α,21 - trihydroxy - allopregnene 3 - semicarbazone 21 - benzoate, and the like.

The hydrolysis of this 3-semicarbazone is conveniently conducted by bringing the 9α-fluoro-Δ¹-3,20-diketo-11-oxygenated - 17 - hydroxy - 21 - acyloxy - allopregnene 3-semicarbazone compound into intimate contact with an aqueous solution of an acid as for example an organic acid such as acetic acid, propionic acid, a mineral acid such as sulfuric acid, hydrohalic acid, hydrochloric acid, phosphoric acid, and the like, preferably in the presence of a carbonyl acceptor such as pyruvic acid, and maintaining the resulting mixture at a temperature from about room temperature to about 100° C. Under these conditions the hydrolysis reaction is ordinarily complete in about 30 minutes at the more elevated temperature, and in about 24 hours when the reaction is conducted at room temperature. In accordance with this preferred hydrolysis procedure utilizing aqueous acetic acid and pyruvic acid, there is obtained the corresponding 9α-fluoro-Δ¹-3,20-diketo - 11 - oxygenated - 17 - hydroxy - 21 - acyloxy-allopregnene compound as for example 9α,fluoro-Δ¹-3,11,20 - triketo - 17α - hydroxy - 21 - acyloxy - allopregnenes such as 9α-fluoro-Δ¹-3,11,20-triketo-17α,21-dihydroxy - allopregnene 21 - alkanoate, 9α - fluoro - Δ¹-3,11,20 - triketo - 17α,21 - dihydroxy - allopregnene 21-acetate, 9α - fluoro - Δ¹ - 3,11,20 - triketo - 17α,21 - dihydroxy - allopregnene 21 - t - butylacetate, 9α - fluoro - Δ¹ - 3,11,20 - triketo - 17α,21 - dihydroxy - allopregnene 21 - benzoate, 9α - fluoro - Δ¹ - 3,20 - diketo - 11β,17α-dihydroxy - 21 - acyloxy - allopregnenes such as 9α-fluoro - Δ¹ - 3,20 - diketo - 11β,17α,21 - trihydroxy - allopregnene 21 - alkanoate, 9α - fluoro - Δ¹ - 3,20 - diketo-11β,17α,21 - trihydroxy - allopregnene 21 - acetate, 9α-fluoro - Δ¹ - 3,20 - diketo - 11β,17α,21 - trihydroxy - allopregnene 21 - t - butylacetate, 9α - fluoro - Δ¹ - 3,20-diketo - 11β,17α,21 - trihydroxy - allopregnene 21 - benzoate, and the like. The 9α-fluoro-Δ¹-3,11,20-triketo-17α - hydroxy - 21 - acyloxy - allopregnene and the 9α-fluoro - Δ¹ - 3,20 - diketo - 11β,17α - dihydroxy - 21-acyloxy-allopregnene may be hydrolyzed, if desired, by reaction with an alcoholic solution of potassium hydroxide to produce 9α-fluoro-Δ¹-3,11,20-triketo-17α,21-dihydroxy-allopregnene and 9α-fluoro-Δ¹-3,20-diketo-11β,17α, 21-trihydroxy-allopregnene, respectively.

The following examples illustrate methods of carrying out the present invention but it is to be understood that these examples are given for purposes of illustration and not of limitation.

*Example 1*

Four grams of 9α-fluoro-3,20-diketo-11β,17α,21-trihydroxy-allopregnane 21-acetate is dissolved in 200 cc. of chloroform, a few drops of an acetic acid solution of p-toluene sulfonic acid monohydrate is added to the solution, and to the resulting solution is added an acetic acid solution of bromine containing one molar equivalent of bromine. The resulting mixture is stirred for a few minutes to complete decolorization of the bromine, the chloroform is evaporated from the reaction mixture in vacuo, and the actic acid reaction mixture is mixed with water and ice thereby precipitating the brominated steroid product. This precipitated material is recovered by filtration to give crude 2-bromo-9α-fluoro-3,20-diketo-11β,17α,21-trihydroxy-allopregnane 21-acetate. The latter material is dissolved in dichloromethane, and the resulting solution is washed with an aqueous sodium bicarbonate solution and then with water, and dried over anhydrous magnesium sulfate. The dried solution is evaporated to dryness in vacuo, and the residual material recrystallized from acetonitrile to give substantially pure 2-bromo-9α-fluoro-3,20-diketo-11β,17α,21-trihydroxy-allopregnane 21-acetate.

The 2-bromo-9α-fluoro-3,20-diketo-11β,17α,21-trihydroxy-allopregnane 21-acetate is dissolved in acetonitrile and the resulting solution is mixed with an aqueous solution of semicarbazide hydrochloride and sodium acetate. The resulting mixture is maintained under an inert (nitrogen) atmosphere for a period of about 4½ hours, and the precipitated material is recovered by filtration and washed with water to give 9α-fluoro-Δ¹-3,20-diketo-11β, 17α,21-trihydroxy-allopregnene 3-semicarbazone 21-acetate.

Example 2

About 0.620 g. of 9α,fluoro-Δ¹-3,20-diketo-11β,17α,21-trihydroxy-allopregnene 3-semicarbazone 21-acetate is suspended in 18.2 cc. of glacial acetic acid and 7.3 cc. of water, about 0.19 cc. of pyruvic acid is added, and the resulting mixture is allowed to stand in contact with an inert (nitrogen) atmosphere for a period of about 20 hours at room temperature. The resulting mixture is diluted with chloroform, the chloroform mixture is washed repeatedly with water, and the solvents are evaporated from the chloroform solution. The residual material is chromatographed over neutral alumina to give substantially pure 9α-fluoro-Δ¹-3,20-diketo-11β,17α,21-trihydroxy-allopregnene 21-acetate; M.P. approximately 237° C.; $[\alpha]_D$ +34.9° in acetone; U.V. λ max in methanol 222 mμ (log E 4.03);

infrared $\lambda_{max}^{Nujol}$ 2.77μ, 2.98μ, 5.73μ, 578μ, 605μ,

The 9α-fluoro-Δ¹-3,20-diketo-11β,17α,21-trihydroxy-allopregnene 21-acetate may be hydrolyzed by treatment with potassium hydroxide in methanol at room temperature to give 9α-fluoro-Δ¹-3,20-diketo-11β,17α,21-trihydroxy-allopregnene.

Example 3

In accordance with the procedure set forth in Example 1 hereinabove, and utilizing as starting material 9α-fluoro-3,11,20-triketo-17α,21-dihydroxy-allopregnane 21-acetate in place of the 9α-fluoro-3,20-diketo-11β,17α,21-allopregnane 21-acetate used in Example 1, there are obtained 2-bromo-9α-fluoro-3,11,20-triketo-17α,21-dihydroxy-allopregnane 21-acetate and 9α-fluoro-Δ¹-3,11,20-triketo-17α,21-dihydroxy-allopregnene 3 - semicarbazone 21-acetate.

In accordance with the procedure set forth in Example 2 hereinabove, and utilizing as starting material 9α-fluoro-Δ¹-3,11,20-triketo-17α,21-dihydroxy-allopregnene 3-semicarbazone 21-acetate, there are obtained 9α-fluoro-Δ¹-3,11,20-triketo-17α,21-dihydroxy-allopregnene 21-acetate and 9α - fluoro-Δ¹-3,11,20-triketo-17α,21-dihydroxy-allopregnene.

The 9α - fluoro-3,20-diketo-11β,17α,21-trihydroxy-allopregnane 21-acetate, utilized as starting material in Example 1 hereinabove, may be prepared starting with 9α-fluoro-hydrocortisone acetate (Δ⁴-9α-fluoro-3,20-diketo-11β,17α,21-trihydroxy-pregnene 21-acetate) as follows: 6.0 g. of 5% palladium on charcoal catalyst are added to a suspension of 7.25 g. of said Δ⁴-9α-fluoro-3,20-diketo-11β,17α,21-trihydroxy-pregnene 21-acetate in 750 cc. of methanol, and the mixture is reacted with hydrogen at atmospheric pressure while maintaining the reactants at about room temperature. The absorption of hydrogen ceases after about 15 minutes; the amount of hydrogen absorbed corresponds to one mole. The reaction mixture is filtered, thereby removing the catalyst, and the catalyst is washed thoroughly with methanol. The filtrate and washings are combined, and the resulting solution is evaporated to dryness in vacuo. The residual material is then recrystallized twice from acetone to give about 4 grams of substantially pure 9α-fluoro-3,20-diketo-11β,17α-dihydroxy-21-acetoxy-allopregnane.

The 9α - fluoro-3,11,20-triketo-17α,21-dihydroxy-allopregnane 21-acetate, utilized as starting material in Example 3 hereinabove, may be prepared by hydrogenating 9α-fluoro-cortisone acetate (Δ⁴-9α-fluoro-3,11,20-triketo-17α-21-dihydroxy-pregnene 21-acetate) in accordance with the foregoing hydrogenation procedure using 5% palladium on charcoal as the hydrogenation catalyst.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting 9α-fluoro-3,11,20 - triketo - 17α - hydroxy - 21 - lower alkanoyloxy-allopregnane with one molecular equivalent of bromine to form the 2-brominated derivative, reacting this compound with semicarbazide to form 9α-fluoro-Δ¹-3,11,20 - triketo - 17α - hydroxy - 21 - lower alkanoyloxy-allopregnene 3-semicarbazone, reacting this 3-semicarbazone with an aqueous solution of acetic acid in the presence of pyruvic acid thereby forming 9α-fluoro-Δ¹-3,11,20 - triketo - 17α,21 - dihydroxy - allopregnene 21 - acylate, and reacting said 9α - fluoro - Δ¹ - 3,11,20 - triketo-17α,21 - dihydroxy - allopregnene 21 - acylate with a methanolic solution of potassium hydroxide to produce 9α - fluoro - Δ¹ - 3,11,20 - triketo - 17α,21 - dihydroxy-allopregnene.

2. The process which comprises reacting 9α-fluoro-3, 20 - diketo - 11β,17α - dihydroxy - 21 - lower alkanoyloxy-allopregnane with one molecular equivalent of bromine to form the 2-brominated derivative, reacting said 2-brominated derivative with semicarbazide to produce 9α - fluoro - Δ¹ - 3,20 - diketo - 11β,17α - dihydroxy - 21-lower alkanoyloxy - allopregnene 3 - semicarbazone, reacting this 3-semicarbazone with an aqueous solution of acetic acid in the presence of pyruvic acid thereby forming 9α - fluoro - Δ¹ - 3,20 - diketo - 11β,17α - dihydroxy-21 - lower alkanoyloxy - allopregnene, and reacting said 9α - fluoro - Δ¹ - 3,20 - diketo - 11β,17α - dihydroxy - 21-lower alkanoyloxy - allopregnene with a methanolic solution of potassium hydroxide to produce 9α-fluoro-Δ¹-3,20 - diketo - 11β,17α,21 - trihydroxy - allopregnene.

3. 9α - fluoro - Δ¹ - 3,11,20 - triketo - 17α - hydroxy-21-lower alkanoyloxy-allopregnene.

4. 9α - fluoro - Δ¹ - 3,11,20 - triketo - 17α,21 - dihydroxy-allopregnene.

5. 9α - fluoro - Δ¹ - 3,11,20 - triketo - 17α,21 - dihydroxy-allopregnene 21-acetate.

6. 9α - fluoro - Δ¹ - 3,20 - diketo - 11β,17α-dihydroxy-21-lower alkanoyloxy-allopregnene.

7. 9α - fluoro - Δ¹ - 3,20 - diketo - 11β,17α,21 - trihydroxy-allopregnene.

8. 9α - fluoro - Δ¹ - 3,20 - diketo - 11β,17α,21 - trihydroxy-allopregnene 21-acetate.

References Cited in the file of this patent

UNITED STATES PATENTS

| | | |
|---|---|---|
| 2,703,799 | Bergstrom | Mar. 8, 1955 |
| 2,707,190 | Farrar | Apr. 26, 1955 |
| 2,736,681 | Tishler | Feb. 28, 1956 |

OTHER REFERENCES

Fried: Jour. Am. Chem. Soc. 75, 2273 (1953).
Fried: Jour. Am. Chem. Soc. 76, 1455–6 (1954).

Notice of Adverse Decision in Interference

In Interference No. 90,463 involving Patent No. 2,885,412, R. F. Hirschmann and R. Miller, 9α-fluoro-$\Delta^1$-3,20-diketo-11,21-bis-oxygenated-17-hydroxyallopregnenes and processes for preparing them, final judgment adverse to the patentees was rendered Nov. 29, 1962, as to claims 3, 4, 5, 6, 7 and 8.

[*Official Gazette February 5, 1963.*]